(12) United States Patent
Nash et al.

(10) Patent No.: US 10,242,458 B2
(45) Date of Patent: Mar. 26, 2019

(54) REGISTRATION OF RANGE IMAGES USING VIRTUAL GIMBAL INFORMATION

(71) Applicant: QUALCOMM Incorporated, San Diego, CA (US)

(72) Inventors: James Nash, San Diego, CA (US); Kalin Atanassov, San Diego, CA (US); Albrecht Johannes Lindner, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/493,859

(22) Filed: Apr. 21, 2017

(65) Prior Publication Data

US 2018/0308249 A1 Oct. 25, 2018

(51) Int. Cl.
G06K 9/00 (2006.01)
G06T 7/73 (2017.01)
G06K 9/46 (2006.01)
G06T 7/33 (2017.01)

(52) U.S. Cl.
CPC .............. *G06T 7/73* (2017.01); *G06K 9/4604* (2013.01); *G06T 7/33* (2017.01); *G06T 2207/10028* (2013.01)

(58) Field of Classification Search
None
See application file for complete search history.

(56) References Cited

U.S. PATENT DOCUMENTS 9,418,475 B2 8/2016 Medioni et al.
9,489,745 B1 11/2016 Heitz, III
2004/0001620 A1* 1/2004 Moore ................. G06K 9/6211
   382/154
2013/0329013 A1 12/2013 Metois et al.
2016/0070265 A1 3/2016 Liu et al.
2016/0086385 A1* 3/2016 Gourlay ................. G06T 19/20
   382/154
2016/0253807 A1 9/2016 Jones et al.

FOREIGN PATENT DOCUMENTS

CN 103247225 A 8/2013

OTHER PUBLICATIONS

International Search Report and Written Opinion—PCT/US2018/018394—ISA/EPO—May 3, 2018.

* cited by examiner

*Primary Examiner* — Kevin Ky
(74) *Attorney, Agent, or Firm* — Norton Rose Fulbright LLP

(57) ABSTRACT

Systems and methods configured to generate virtual gimbal information for range images produced from 3D depth scans are described. In operation according to embodiments, known and advantageous spatial geometries of features of a scanned volume are exploited to generate virtual gimbal information for a pose. The virtual gimbal information of embodiments may be used to align a range image of the pose with one or more other range images for the scanned volume, such as for combining the range images for use in indoor mapping, gesture recognition, object scanning, etc. Implementations of range image registration using virtual gimbal information provide a realtime one shot direct pose estimator by detecting and estimating the normal vectors for surfaces of features between successive scans which effectively imparts a coordinate system for each scan with an orthogonal set of gimbal axes and defines the relative camera attitude.

26 Claims, 7 Drawing Sheets

REGISTRATION OF RANGE IMAGES USING VIRTUAL GIMBAL INFORMATION

FIELD

Aspects of the present disclosure relate generally to three-dimensional depth scanning. More particularly, certain embodiments of the technology discussed below relate to use of virtual gimbal information for registration of range images produced from three-dimensional depth scans.

BACKGROUND

Three-dimensional (3D) depth scanning technology is becoming more commonly available for a variety of uses. In particular, consumer mobile 3D depth scanning, such as for indoor mapping, gesture recognition, and object scanning, is a rapidly proliferating technology space.

3D depth scanning utilizes a depth sensor to generate a depth map. For example, a 3D depth scanning system may comprise a depth camera having a sensor operable to capture depth, as opposed to sensing light as in a typical photographic image camera, to provide a depth map comprising pixels having units in depth. As a specific example, in an active sensing implementation of a 3D depth scanning system, a spatial mask comprising a known pattern (e.g., a mask having vertical stripes) is illuminated or projected onto a scene or 3D object, whereby the illumination pattern on the scene or on the 3D object typically encodes depth information for the scene or the 3D object. A receiver sensor captures an image of the scene or 3D object with the spatial mask projected thereon and the pattern or code within the spatial mask in the captured image is then used to ascertain a depth for the scene or object in the image. Based on patterns captured in an image of the scene, a depth map may be generated by the 3D depth scanning system that indicates different depths in the scene.

Depth maps produced by such 3D depth scanning systems are used to generate 3D point clouds. Each such point cloud comprises a set of data points in some coordinate system (e.g., points defined by X, Y, and Z coordinates) representing the external surfaces in a scene or 3D object. For surface reconstruction, a plurality of point clouds are aligned to a common coordinate frame in order to create a dense sampling of the scanned volume. For example, point clouds generated from a plurality of scans of the scene or 3D object, such as from different views or poses, are registered to common coordinate system and the registered point clouds are combined to create dense point cloud sets, such as for use in indoor mapping, gesture recognition, object scanning, etc.

Current solutions for point cloud registration require computationally intensive iterative methods, such as Iterative Closest Point or Polygonal Mesh. The convergence of these iterative schemes depends on small perturbations between successive scans and is also influenced by the initial condition. Further, the point clouds are typically very large data sets (e.g., millions of points). Accordingly, such computationally intensive techniques, requiring substantial processing to register high dimensional scans, are not readily implemented by a variety of processing platforms in use today, particularly the processing platforms provided by smartphones and tablet devices favored for use in consumer mobile 3D depth scanning.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method for determining a coordinate system for a range image is provided. The method can include identifying a feature present in the range image and deconstructing the feature present in the range image into virtual gimbal information for the range image using estimates of two or more orthogonal axes for the feature present in the range image. In accordance with the method of embodiments, the virtual gimbal information defines the coordinate system for the range image.

In another aspect of the disclosure, an apparatus for determining a coordinate system for a range image is provided. The apparatus includes a memory and at least one processor coupled to the memory. The at least one processor can be configured to identify a feature present in the range image and to deconstruct the feature present in the range image into virtual gimbal information for the range image using estimates of two or more orthogonal axes for the feature present in the range image. In accordance with the apparatus of embodiments, the virtual gimbal information defines the coordinate system for the range image.

In still another aspect of the disclosure, a non-transitory computer-readable medium having program code recorded thereon for determining a coordinate system for a range image is provided. The program code can include code to identify a feature present in the range image and deconstruct the feature present in the range image into virtual gimbal information for the range image using estimates of two or more orthogonal axes for the feature present in the range image. In accordance with the non-transitory computer-readable medium of embodiments, the virtual gimbal information defines the coordinate system for the range image.

In yet another aspect of the disclosure, an apparatus for determining a coordinate system for a range image is provided. For example, the apparatus can include means for identifying a feature present in the range image and means for deconstructing the feature present in the range image into virtual gimbal information for the range image using estimates of two or more orthogonal axes for the feature present in the range image. In accordance with embodiments of the apparatus, the virtual gimbal information defines the coordinate system for the range image.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case.

Figure 1:
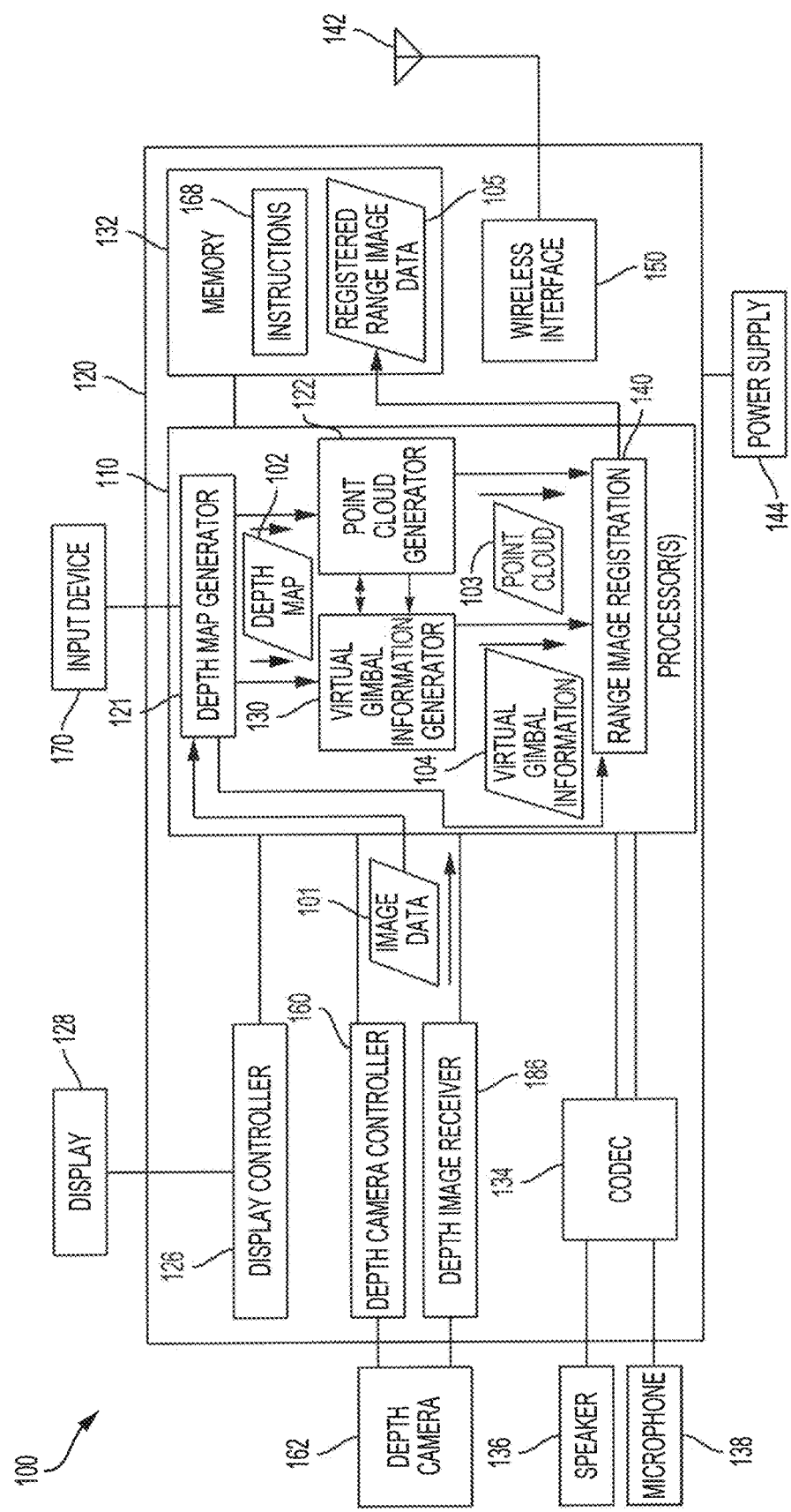
FIG. 1 shows a block diagram of a 3D depth scanning system configuration according to aspects of the present disclosure.

FIG. 1 shows a block diagram of an illustrative example of a three-dimensional (3D) depth scanning system configured for registration of range images produced from 3D depth scans using virtual gimbal information according to concepts of the present disclosure. 3D depth scanning system 100 of the illustrated embodiment comprises a wireless device providing a processor-based platform operable in accordance with concepts described herein. For example, the processor-based wireless device of embodiments of 3D depth scanning system 100 may comprise a communications device, a fixed location data unit, a mobile location data unit, a mobile phone, a cellular phone, a satellite phone, a computer, a tablet, a portable computer, or a desktop computer. Additionally or alternatively, the processor-based wireless device of embodiments of 3D depth scanning system 100 may comprise a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As further illustrative, non-limiting examples, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. It should be appreciated that the device providing a processor-based platform for 3D depth scanning system 100 of embodiments may not be configured as a wireless device (e.g., a wireline connected device, a standalone device, etc.), such as where wireless communication is not utilized by the device or the 3D depth scanning system.

3D depth scanning system 100 embodiments provides a processor-based platform operable to perform various functions such as data input, data output, data processing, data storage, and/or data communication, in association with and/or in addition to operation for registration of range images produced from 3D depth scans using virtual gimbal information in accordance with embodiments herein. Accordingly, the embodiment of 3D depth scanning system 100 shown in FIG. 1 display controller 126 that is coupled to processor(s) 110 and to display 128. Coder/decoder (CODEC) 134 of the illustrated embodiment, having speaker 136 and microphone 138 coupled thereto, is also coupled to processor(s) 110. Input device 170, such as a touch screen, keyboard, digital pointer, etc., is also coupled to processor(s) 110 in the embodiment of FIG. 1. Processor(s) 110 of the illustrated embodiment may also be coupled to depth camera controller 160 that is coupled to depth camera 162. Wireless interface 150, such as a wireless controller, is coupled to processor(s) 110 and to an antenna 142 of the illustrated embodiment of 3D depth scanning system 100. Power supply 144 is shown in the illustrated embodiment to provide power for operation of 3D depth scanning system 100.

In some implementations, the processor(s) 110, display controller 126, camera controller 160, memory 132, CODEC 134, and wireless interface 150 are included in a system-in-package or system-on-chip device (e.g., system-on-chip device 120). Display 128, input device 170, speaker 136, microphone 138, antenna 142, depth camera 162, and power supply 144 may be external to system-on-chip device 120 in some implementations, although may be coupled to one or more components of system-on-chip device 120, such as an interface, a controller, a transmitter (e.g., transmitter circuitry), a receiver (e.g., receiver circuitry), etc.

Depth camera 162, depth camera controller 160, and depth image receiver 186 of embodiments of 3D depth scanning system 100 are cooperatively operable to capture depth information with respect to a scanned scene or 3D object (collectively and individually referred to herein as a scanned volume). Depth camera 162 may, for example, comprise a structured light system implementing active sensing. Accordingly, camera 162 of embodiments may comprise a spatial mask projector and a receiver sensor (e.g., depth pixel sensor), such as may be operable under control of depth camera controller 160. In operation, the receiver sensor of camera 162 may capture a depth image of the scanned volume with the spatial mask projected thereon and provide captured depth image to depth image receiver 186. Depth image receiver 186 may use the captured depth image to ascertain image depth data for the scanned volume of the image. The image depth data provided by depth image receiver 186 may be utilized (e.g., by processor(s) 110) to generate a depth map, such as may be utilized in various applications including indoor mapping, gesture recognition, and object scanning.

Processor(s) 110 of the embodiment of 3D depth scanning system 100 shown in FIG. 1 may comprise one or more processor units (e.g., one or more processing cores, such as homogeneous and/or heterogeneous combinations of processing cores), such as a digital signal processor (DSP), a graphical processing unit (GPU), and/or a central processing unit (CPU). Processor(s) 110 of the illustrated embodiment is coupled to memory 132, such as various configurations of processor-readable media including random access memory (RAM), flash memory, read only memory (ROM), electrically programmable read only memory (EPROM), erasable electrically programmable read only memory (EEPROM), registers, hard disk, a removable disk, a CD-ROM, or any other form of storage medium known in the art suitable for operation as described herein. Memory 132 as shown in FIG. 1 includes instructions 168 (e.g., executable code logic), such as computer-readable instructions or processor-readable instructions. Instructions 168 of embodiments include one or more instruction sets defining operation for registration of range images produced from 3D depth scans using virtual gimbal information according to concepts of the present disclosure that are executable by a computer, such as by processor(s) 110. Accordingly, using instructions 168, processor(s) 110 may be configured to perform as one or more logic units operable to provide depth map generator functionality, point cloud generator functionality, virtual gimbal information generator functionality, and/or range image registration functionality (e.g., as may be provided by depth map generator 121, point cloud generator 122, virtual gimbal information generator 130, and range image registration 140) of an implementation of embodiments of the present disclosure.

In facilitating use of depth information provided by depth camera 162 in various applications, such as indoor mapping, gesture recognition, object scanning, etc., embodiments of 3D depth scanning system 100 are configured to generate virtual gimbal information for range images (e.g., depth maps and/or point clouds) produced from three-dimensional depth scans. In operation according to embodiments, logic of 3D depth scanning system 100 exploits known and advantageous spatial geometries of features (e.g., any structure whose geometry and/or orientation is fixed and known) of a scanned volume to provide a simplified and realtime registration technique. For example, features having two or more perpendicular surfaces (e.g., at least one right angle), such as corners (e.g., a corner formed by walls, floor, and/or ceiling of a room, by the top surface and one or more sides/edges of a table, by a picture, window, or door frame, by a door slab, boxes, cabinets, etc.), may be identified in image data and used to generate virtual gimbal information for a pose. It should be appreciated that, when scanning indoors or buildings in particular, there exists a wide variety of features exhibiting features having structural attributes (e.g., two or more perpendicular surfaces) suitable for use in generating virtual gimbal information according to concepts of the present disclosure. Irrespective of the particular feature or features from which it is derived, the virtual gimbal information of embodiments provides a closed form low dimensional output for various uses, such as determining a relative orientation of a camera, registering multiple range images for different poses of a scanned volume, etc.

Virtual gimbal information of embodiments may be used by logic of 3D depth scanning system 100 to align a range image of the pose with one or more other range images (e.g., registered to common coordinate system) for the scanned volume (e.g., different poses, such as where the poses provide scans of the scanned volume from different angles or vantage points to provide a more complete scan of the scanned volume than is provided by a scan of a single pose), such as for combining the range images for use in indoor mapping, gesture recognition, object scanning, etc. In operation, implementations of range image registration using virtual gimbal information according to the concepts herein provide a realtime one shot direct pose estimator by detecting and estimating the normal vectors for surfaces of virtual gimbal features (e.g., features having two or more perpendicular surfaces) between successive scans which effectively imparts a coordinate system for each scan with an orthogonal set of gimbal axes and defines the relative camera attitude. It should be appreciated that such operation does not require iteration or correspondence matching, works for arbitrary scan orientations, is highly accurate, and is not sensitive to noise or point cloud size. Range image registration using virtual gimbal information of embodiments may be used alone to provide range image registration and/or may be used in association with other range image registration techniques (e.g., used as an initialization to speed up existing registration techniques, such as computationally intensive Iterative Closest Point or Polygonal Mesh methods for point cloud registration).

Figure 2:
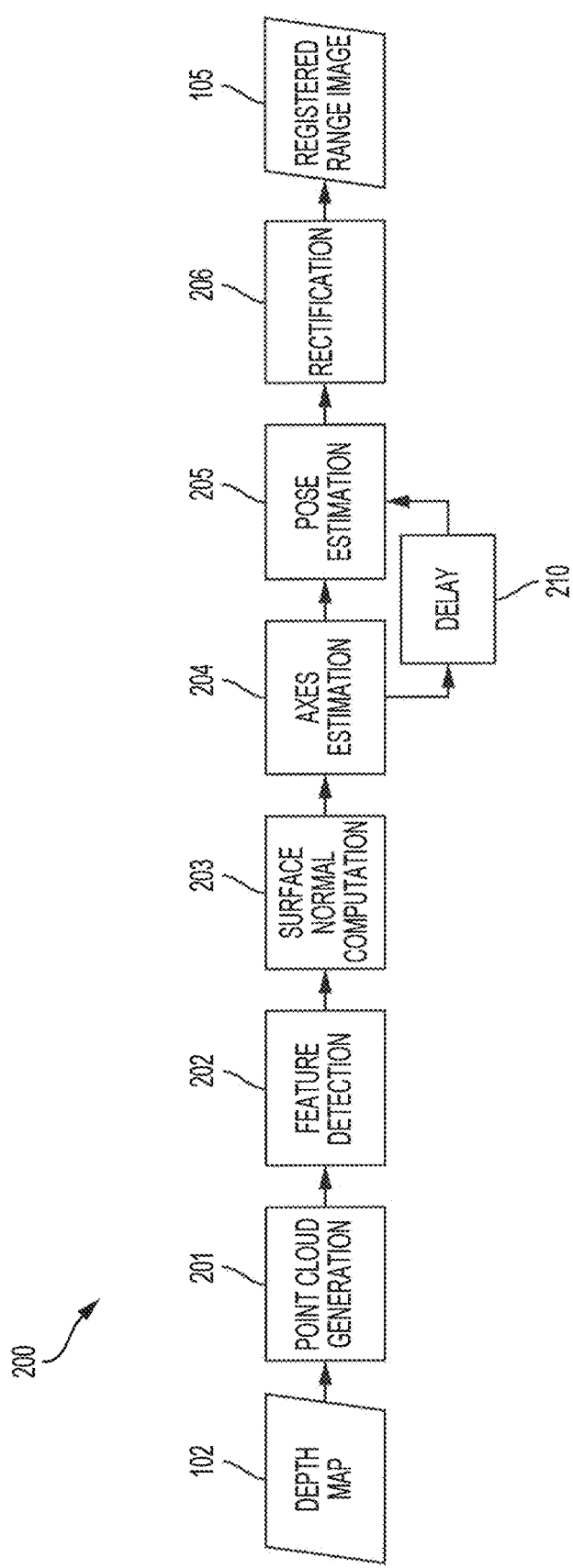
FIG. 2 shows a flow diagram for providing range image registration using virtual gimbal information according to aspects of the present disclosure.

FIG. 2 shows a flow diagram for operation providing range image registration using virtual gimbal information in accordance with embodiments of the present disclosure. Flow 200 of the embodiment illustrated in FIG. 2 may, for example, be implemented by functional blocks of 3D depth scanning system 100 of FIG. 1 to provide range image registration according to concepts herein.

Figure 3A:
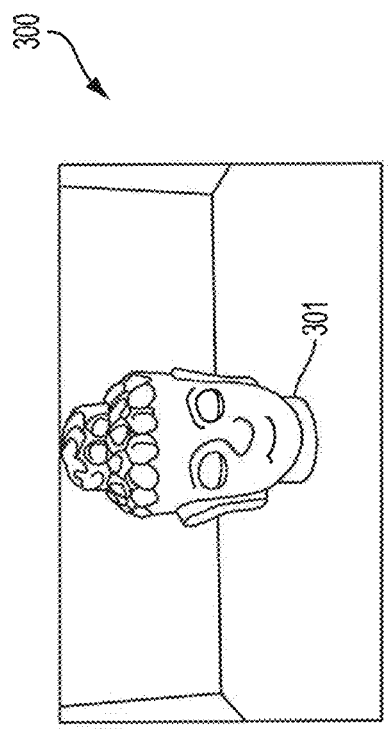
FIG. 3A shows an exemplary scene and 3D object as may be scanned using depth camera according to aspects of the present disclosure.
Figure 3B:
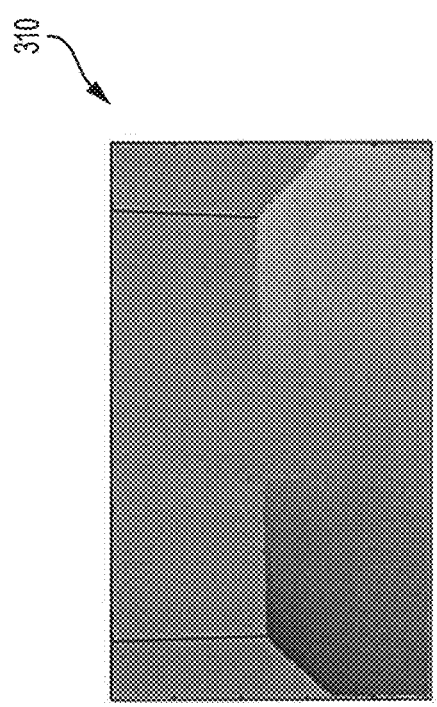
FIG. 3B shows an exemplary depth map as may be generated from a scan of the scene and 3D object of FIG. 3A according to aspects of the present disclosure.

Operation according to flow 200 of embodiments may be provided in association with 3D scanning of a scanned volume. For example, scene 300 and/or 3D object 301 of FIG. 3A may be scanned using depth camera 162 of FIG. 1, such as in association with an indoor mapping, gesture recognition, or object scanning application. Accordingly, image data 101 for a particular pose or view of scene 300 or object 301 may be provided by depth image receiver 186 to depth map generator 121 for generation of a depth map as may be used to generate a 3D point cloud for surface reconstruction (e.g., through combining a plurality of point clouds to create a dense sampling of the scanned volume). Depth map generator 121 may thus generate depth map 310 of FIG. 3B comprising pixels having units in depth that indicate different depths of the scanned volume (e.g., scene 300 and/or 3D object 301). Depth map 310 may, for example, be provided by depth map generator 121 in the form of depth map data 102 shown in FIG. 1.

Figure 3C:
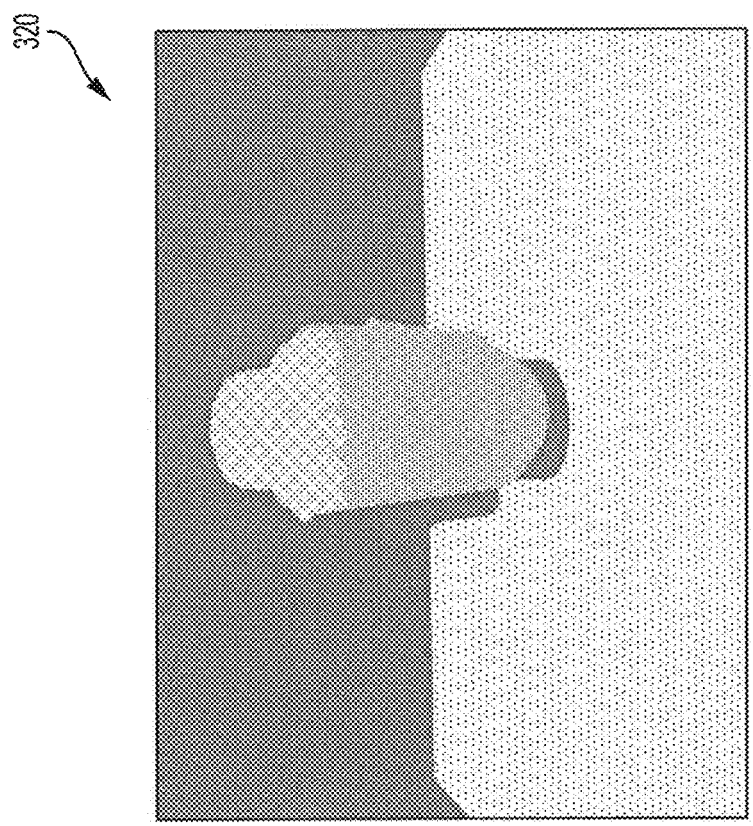
FIG. 3C shows an exemplary point cloud as may be generated from the depth map of FIG. 3B according to aspects of the present disclosure.

At block 201 of the embodiment of flow 200 shown in FIG. 2, a point cloud (e.g., point cloud 320 of FIG. 3C) is generated for the scanned volume (e.g., scene 300 or 3D object 301) from depth map data 102. For example, point cloud generator 122 of FIG. 1 may utilize depth map data 102 to generate point cloud data 103 for the scanned volume.

Figure 4A:
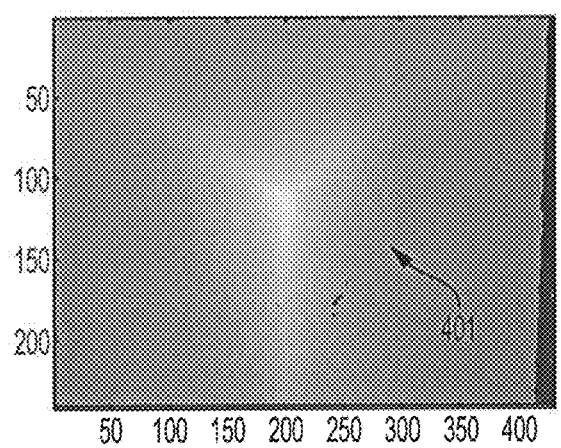
FIG. 4A shows an exemplary feature present in a depth map as may be identified using a feature detection scheme according to aspects of the present disclosure.

In operation according to the embodiment illustrated in FIG. 2, one or more features in the scanned volume is detected for generating virtual gimbal information at block 202. For example, virtual gimbal information generator 130 of FIG. 1 may operate to detect one or more features, such as a feature having a structure whose geometry and/or orientation is fixed and known (e.g., features having two or more perpendicular surfaces, such as right angles formed by walls, a floor, and/or ceiling of a room, by the top surface and one or more sides/edges of a table, by a picture, window, or door frame, by a door slab, boxes, cabinets, etc.) in the depth map (e.g., depth map data 102) for the scanned volume. As an example, a feature, such as virtual gimbal feature 401 shown FIG. 4A as comprising two or more right angles (e.g., as may represent a corner present in the image), may be identified in depth map data 102 using various feature detection schemes. Embodiments may, for example, use principal component analysis (PCA), eigenvalue analysis, a fitting normal plains method for finding the normal vector to fit into the normal plain to identify perpendicular plains of a corner, etc. to identify one or more virtual gimbal features in a depth map. It should be appreciated that, although exemplary virtual gimbal feature 401 is shown in FIG. 4A as a concave right angle configuration, embodiments may similarly utilize a convex right angle configuration as a virtual gimbal feature for generating virtual gimbal information herein.

Figure 4B:
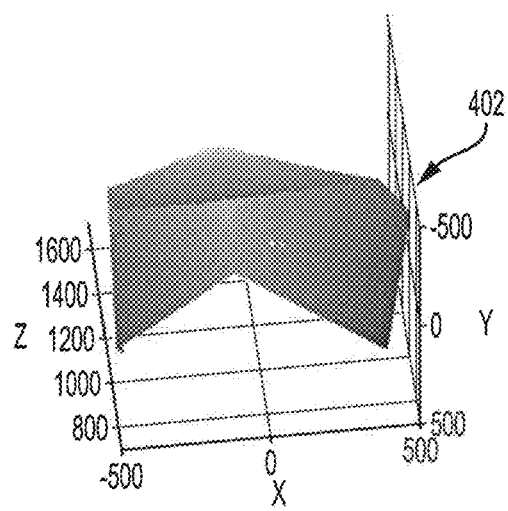
FIG. 4B shows an exemplary feature point cloud generated for the feature present in the depth map of FIG. 4A according to aspects of the present disclosure.
Figure 4C:
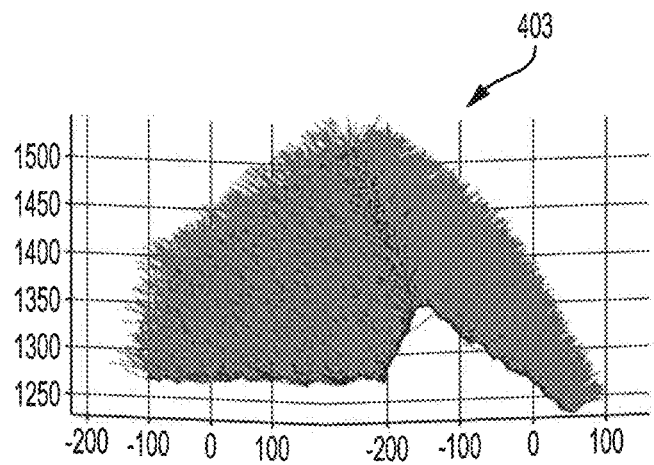
FIG. 4C shows exemplary surface normal vector estimations for the feature point cloud of FIG. 4B according to aspects of the present disclosure.

Having identified one or more features (e.g., virtual gimbal feature 401) in the scanned volume, operation at block 203 of the illustrated embodiment performs surface normal computation to facilitate estimation of one or more axes from the identified one or more features. For example, virtual gimbal information generator 130 of FIG. 1 may perform surface normal computations with respect to perpendicular surfaces of the identified feature. In operation according to embodiments, logic of virtual gimbal information generator 130 locates the identified one or more features (e.g., virtual gimbal feature 401) in point cloud data 103 for the scanned volume for use in surface normal computations. Alternatively, logic of virtual gimbal information generator 130 may communicate with point could generator 122 to generate one or more point clouds (e.g., feature point cloud 402 of FIG. 4B) for one or more features identified in the depth map and the feature point cloud may be used in surface normal computations. The surface normal computations implemented according to embodiments computes surface normal vectors (e.g., surface normal estimation 403 of FIG. 4C) for a plurality of points of the surface of the perpendicular surfaces of the identified one or more feature represented in the point cloud, such as using local plane fit or principle component analysis (PCA).

Figure 5A:
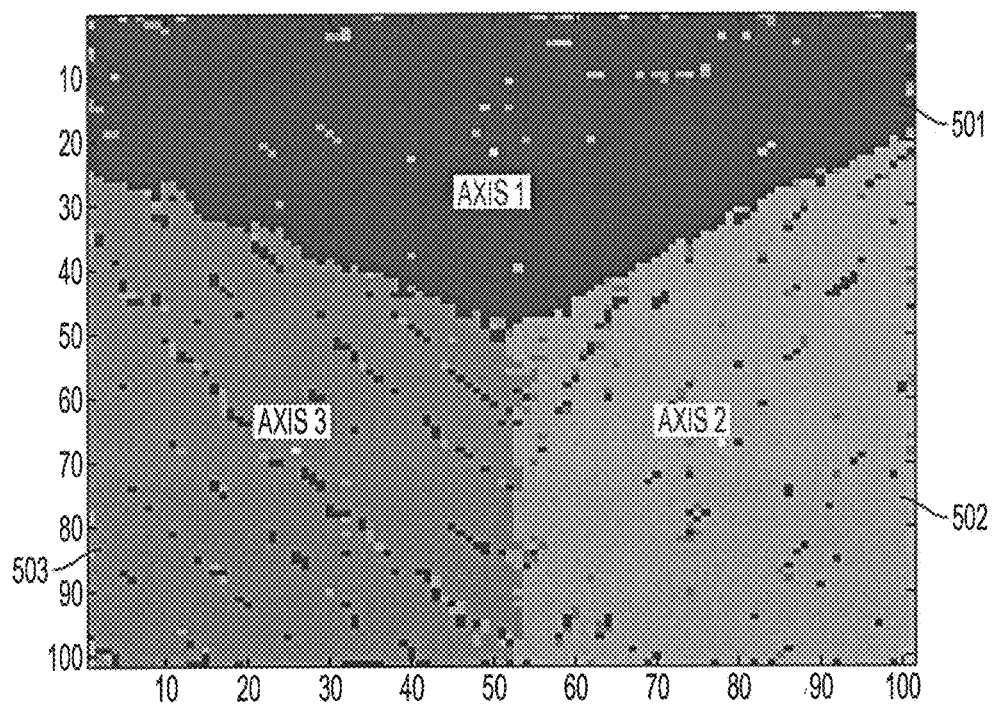
FIGS. 5A and 5B show axes as may be estimated using the surface normal vector estimations of FIG. 4C according to aspects of the present disclosure.
Figure 5B:
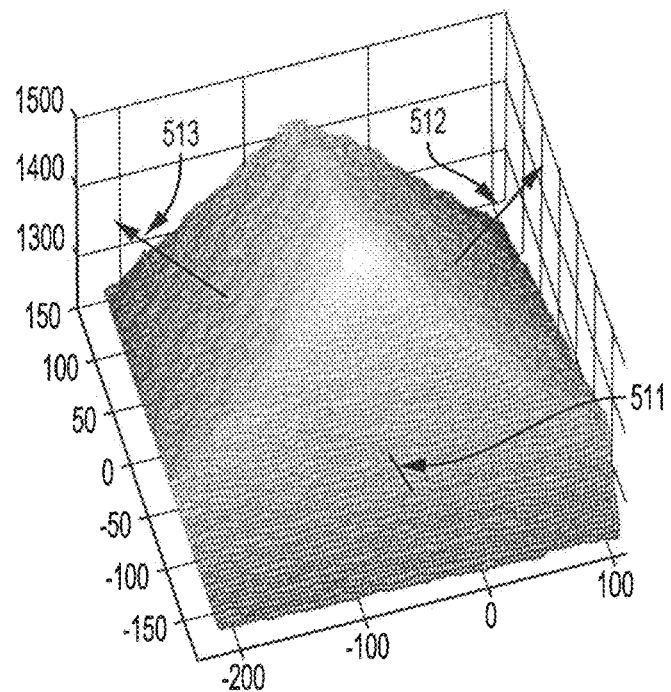

At block 204 of the embodiment of flow 200 shown in FIG. 2, one or more axes for orientation of the scanned volume is estimated. For example, virtual gimbal information generator 130 of FIG. 1 may operate to estimate an axis for each perpendicular surface of the one or more identified features from the results of the surface normal computations. In operation according to embodiments, logic of virtual gimbal information generator 130 implements a clustering algorithm (e.g., K-means clustering) to estimate an axis for a surface from a plurality of surface normal vectors computed for the surface. For example, as shown in FIG. 5A, surfaces 501, 502 and 503 of a virtual gimbal feature identified in a scanned volume each has an axis associated therewith. Each of these axes may be estimated for the respective surfaces (e.g., as shown in FIG. 5B) using a clustering algorithm with respect to the surface normal vectors computed for each such surface. It should be appreciated that the estimated axes impart a coordinate system for the scanned volume with an orthogonal set of gimbal axes defining the relative camera attitude. In particular, the identified feature (e.g., virtual gimbal feature 401) is deconstructed into a coordinate system for the range image. Accordingly, virtual gimbal information (e.g., virtual gimbal information data 104 of FIG. 1) for the scanned volume is provided by virtual gimbal information generator 130 comprising some or all of the estimated axes (e.g., one or more sets of perpendicular axes estimated for the scanned volume).

Figure 6:
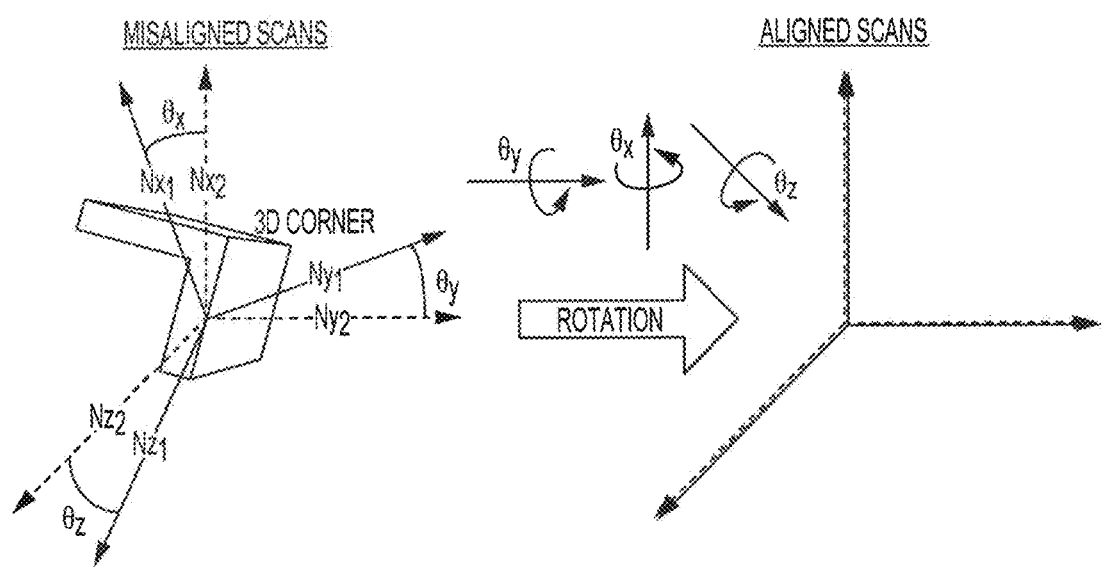
FIG. 6 shows relative misalignment of two scans of a scanned volume as may be determined using virtual gimbal information according to aspects of the present disclosure.

Virtual gimbal information generated according to embodiments of the disclosure may be utilized for registration of range images produced from 3D depth scans of 3D depth scanning system 100. In particular, a plurality of range images (e.g., depth maps and/or point clouds) may be aligned to a common coordinate frame (e.g., registered to a common coordinate system) to align range images of a plurality of poses or views for the scanned volume, such as for combining the range images, using virtual gimbal information of embodiments herein. For example, two scans of a scanned volume may be misaligned with respect to each other in any or all of the X, Y, and Z axes, as shown by relative misalignment angles θx, θy, and θz of FIG. 6. A range image for one such scan may thus be rotated about any or all of the X, Y, and Z axes by an amount of a corresponding misalignment angle (e.g., −θx, −θy, and −θz) for each such range image to provide aligned range images for the two scans. Accordingly, virtual gimbal information of embodiments is utilized as a coordinate system to provide appropriate translation information facilitating accurate registration of range images, without relying upon operation to directly match features in the range images wherein such matching of features in the 3D images is prone to errors (e.g., due to the thousands of points for each feature in the range images).

Consistent with the foregoing, at block 205 of flow 200 shown in FIG. 2 pose estimation is performed with respect to range images of a scanned volume. For example, range image registration 140 may use virtual gimbal information 104 generated for scans of a scanned volume to determine a pose orientation (e.g., corresponding to the camera orientation) for the scan. Such pose orientation information may be utilized in registering scans of a scanned volume. For example, pose estimations for successive scans of a scanned volume (e.g., different views or poses of the scanned volume) may be utilized to determine relative misalignment and facilitate translation of range images to a common coordinate system.

In operation according to embodiments, a pose matrix (R) may be generated (e.g., by logic of range image registration 140 as part of the pose estimation functionality) for each of the range images. Embodiments of range image registration 140 utilize pose matrices for two range images in translating range images to a common coordinate system. For example, logic of range image registration 140 may use singular value decomposition (SVD) or other dot product computation techniques with respect to the pose matrices to determine the relative misalignment for each axis estimated using a particular feature detected in the volume scans. For example, the SVD computation with respect to pose matrices R for two range images may provide a translation vector (T) for rotation of one range image to the coordinate system of the other range image.

It can be appreciated from the foregoing that the axes estimates for each of the two range images to be registered may be used in the determination of the relative misalignment according to embodiments. Accordingly, the illustrated embodiment of flow 200 includes providing a delay (block 210) in a data path between the axes estimation of block 204 and the pose estimation of block 205 to accommodate the time between successive frames to be aligned using virtual gimbal information of embodiments (e.g., to provide the axes estimations for a series of range images for relative misalignment computation of the range images). For example, the delay of block 210 may correspond to the time between a first range image (e.g., a prior scanned volume pose image) for which axes estimations are provided by the axes estimation (block 204) for use in pose estimation (block 205) and a second range image (e.g., a current scanned volume pose image) for which the axes estimations are provided by the axes estimation (block 204) for use in pose estimation (block 205), thereby providing the axes estimates for each such range image for relative misalignment computation. Embodiments may utilize memory accessible for use in pose estimation (block 205) to store axes estimates and/or other data for various range images, such as to provide stored axes estimates and/or other data from which the pose estimation and/or other functions of 3D depth scanning system 100 may be performed.

Information provided by the pose estimation of embodiments may be utilized to register or align multiple range images. Accordingly, at block 206 of flow 200 illustrated in FIG. 2 rectification of range images is performed using pose estimation information. For example, range image registration 140 may use pose estimation information generated for successive scans of a scanned volume (e.g., different views or poses of the scanned volume) to register the range images to a common coordinate system. In operation according to embodiments, logic of range image registration 140 uses relative misalignment information (e.g., relative misalignment angle information, pose matrices R, and/or translation vector T) generated at block 205 to align one range image (e.g., a current scanned volume pose image) with another range image (e.g., a prior scanned volume pose image) to thereby register the range images to a common coordinate system. For example, translation vector T may be applied to a range image (e.g., the points in a point cloud multiplied by the translation vector) to rectify that range image to the common coordinate system (e.g., the coordinate system of the other range image).

In operation according to embodiments, range images having undergone rectification (block 206) may be stored in a memory for various uses. For example, range images registered to one another by operation of rectification processing according to embodiments may be stored as registered range image data 105 of memory 132. Such registered range image data 105 may be utilized by 3D depth scanning system 100, for example, in applications such as indoor mapping, gesture recognition, object scanning, etc.).

Figure 7:
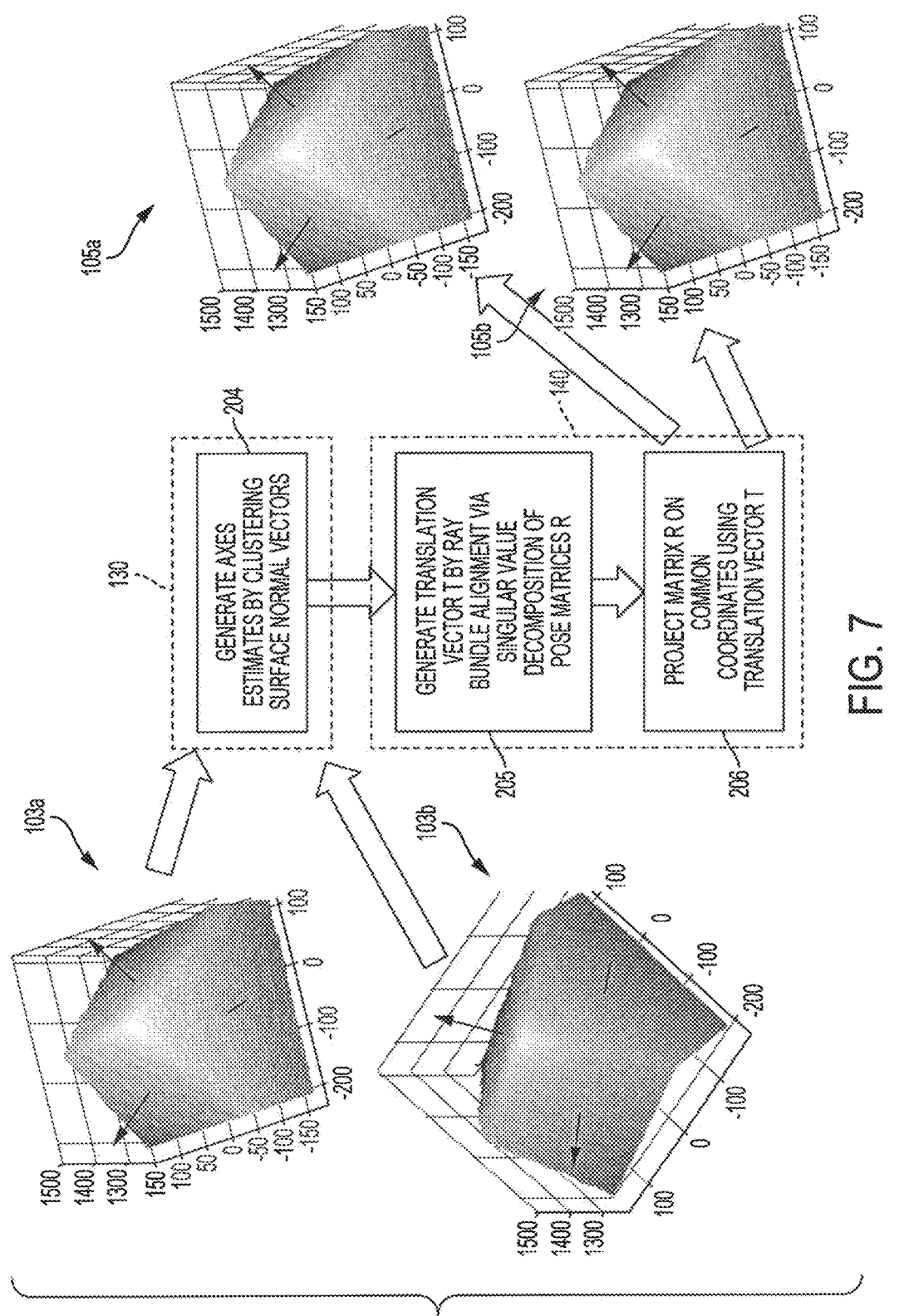
FIG. 7 shows exemplary operation providing range image registration using axis estimations according to aspects of the disclosure.

Operation providing range image registration using virtual gimbal information 104 comprising axis estimations, as may be performed by the axes estimation, pose estimation, and rectification of blocks 204-206 of flow 200 of embodiments, is illustrated in FIG. 7. In the example of FIG. 7, point cloud data 103a may correspond to the scanned volume pose image for a first scan and point cloud data 103b may correspond to the scanned volume pose image for a second scan (e.g., a series of scans of the scanned volume for different poses or views).

In operation according to the exemplary implementation of FIG. 7, logic of virtual gimbal information generator 130 may perform axes estimation generation for point cloud data 103a using clustering of surface normal vectors of perpendicular surfaces of a virtual gimbal feature (e.g., features having two or more perpendicular surfaces) identified in point cloud data 103a. Thereafter, logic of range image registration 140 may generate a pose matrix for point cloud data 103a (e.g., $R_{103a}$) and perform pose estimation for point cloud data 103a. Assuming point cloud data 103a is an initial scan of the scanned volume, the pose estimation may establish the estimated axes of point cloud data 103a as a common coordinate system to which other point clouds (e.g., point cloud 103b) of the scanned volume are to be registered. Alternatively, the point cloud data may be registered to a predetermined common coordinate system. Accordingly, the pose estimation provided with respect to point cloud 103a (e.g., including a case in which point cloud data 103a is an initial scan of the scanned volume) may operate to determine relative misalignment of the point cloud with respect to the predetermined common coordinate system. For example, pose estimation information (e.g., translation vector T) for this point cloud may be generated using ray bundle alignment via SVD. Thereafter, having performed pose estimation for point cloud 103a, the point cloud may be rectified (e.g., register the point cloud to a common coordinate system). For example, logic of range image registration 140 may project pose matrix $R_{103a}$ for point cloud 103a on common coordinates using translation vector T. Alternatively, where an orientation of point cloud 103a is used to establish the common coordinates for a volume scan, the aforementioned projection may be omitted with respect to point cloud 103a as the point cloud is already registered to the common coordinate system. Thereafter, the data of point cloud 103a may be stored as registered range image data (e.g., registered point cloud 105a stored in memory 132 of 3D depth scanning system 100).

The foregoing process may be repeated with respect to one or more additional point clouds to thereby register each point cloud to the common coordinate system. For example, logic of virtual gimbal information generator 130 may perform axes estimation generation for point cloud data 103b using clustering of surface normal vectors of perpendicular surfaces of a virtual gimbal feature (e.g., features having two or more perpendicular surfaces) identified in point cloud data 103b. Thereafter, logic of range image registration 140 may generate a pose matrix for point cloud data 103b (e.g., $R_{103b}$) and perform pose estimation for point cloud data 103b. The pose estimation provided with respect to point cloud 103b may operate to determine relative misalignment of the point cloud with respect to the common coordinate system (e.g., a predetermined common coordinate system to which point cloud 103a was registered or a common coordinate system established based upon the orientation of point cloud 103a). For example, pose estimation information (e.g., translation vector T) for this point cloud may be generated using ray bundle alignment via SVD. Thereafter, having performed pose estimation for point cloud 103b, the point cloud may be rectified (e.g., register the point cloud to a common coordinate system). For example, logic of range image registration 140 may project pose matrix $R_{103b}$ for point cloud 103b on common coordinates using translation vector T. Thereafter, the data of point cloud 103b may be stored as registered range image data (e.g., registered point cloud 105b stored in memory 132 of 3D depth scanning system 100).

It should be appreciated that the data of individual point clouds as registered to the common coordinates may be stored as registered range image data 105 of embodiments. Embodiments of the present disclosure, however, operate to combine the registered point cloud data to generate a dense point cloud (e.g., registered point cloud data 105a and registered point cloud data 105b may be combined to provide a more dense point cloud, such as may be stored as registered range image data 105). Additional point clouds may be processed in accordance with the foregoing and combined with the more dense point cloud data (e.g., registered range image data 105 stored in memory 132 of 3D depth scanning system 100) to provide an even more dense point cloud according to embodiments herein.

Although the same virtual gimbal feature (e.g., a same feature having two or more perpendicular surfaces) as present in two range images (e.g., a same virtual gimbal feature present within point cloud data 103a and 103b) may be identified and used for axes estimation for use in registration according to embodiments, it should be appreciated that a plurality of features may be identified with respect to one or more such range images. For example, a plurality of virtual gimbal features may be identified in a particular range image, such as to identify a virtual gimbal feature common to both the range image of a previous scan and the range image of a subsequent scan to facilitate registration of each such scan of the scanned volume. Additionally or alternatively, multiple virtual gimbal features common to two range images may be utilized in registration of those range images.

Although embodiments have been described above with reference to a 3D depth scanning system, it should be appreciated that range image registration using axis estimations in accordance with the concepts herein may be external to a 3D depth scanning system. For example, embodiments providing range image registration using axis estimations may be implemented in a processor-based system such as a computer (e.g., user workstation) or server (e.g., providing a cloud based service) separate from an 3D image scanner device but nevertheless operable to process range image data provided thereto. However, the range image registration techniques of embodiments, exploiting spatial geometries of features of a scanned volume to provide for simplified registration processing, may be readily implemented in a number of platforms, including mobile device (e.g., smartphones, tablet devices, PDAs, etc.), to enable 3D depth scanning having realtime registration functionality.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

Although the present disclosure and advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for determining a common coordinate system for registration of a plurality of range images, the method comprising:
identifying, by a processor-based platform configured for processing images, a feature present in a range image of the plurality of range images;
deconstructing, by the processor-based platform, the feature present in the range image into virtual gimbal information for the range image using estimates of two or more orthogonal axes for the feature present in the range image, wherein the virtual gimbal information defines the common coordinate system for the plurality of range images for registration of the range image with a second range image of the plurality of range images from a different pose than the range image;
identifying, by the processor-based platform, the feature present in the second range image of the plurality of range images;
deconstructing, by the processor-based platform, the feature present in the second range image into second virtual gimbal information for the second range image using estimates of two or more orthogonal axes for the feature present in the second range image, wherein the second virtual gimbal information defines a coordinate system for the second range image for translation of the second range image to the common coordinate system; and
registering, by the processor-based platform, one of the range image or the second range image to the other one of the second range image or the range image based upon the common coordinate system.

2. The method of claim 1, wherein the feature comprises a corner present in the range image.

3. The method of claim 2, wherein the range image comprises a depth map for a scanned volume.

4. The method of claim 1, wherein the two or more orthogonal axes comprise three orthogonal axes, and wherein the common coordinate system for the range images comprises a coordinate system having an X axis, a Y axis, and a Z axis.

5. The method of claim 1, further comprising:
estimating a pose orientation for the range image using the virtual gimbal information for the range image;
estimating a second pose orientation for the second range image using the second virtual gimbal information for the second range image; and
determining relative translation information for registering the range image and the second range image to the common coordinate system.

6. The method of claim 5, wherein the estimating the pose orientation for the range image generates a pose matrix for the range image and the estimating the second pose orientation for the second range image generates a second pose matrix for the second range image, and wherein the determining the relative translation information generates a translation vector using the pose matrix for the range image and the second pose matrix for the second range image.

7. The method of claim 6, further comprising:
combining the range image and the second range image.

8. An apparatus for determining a common coordinate system for registration of a plurality of range images, the apparatus comprising:
a memory;
at least one processor coupled to the memory, wherein the at least one processor is configured:
to identify a feature present in a range image of the plurality of range images;
to deconstruct the feature present in the range image into virtual gimbal information for the range image using estimates of two or more orthogonal axes for the feature present in the range image, wherein the virtual gimbal information defines the common coordinate system for the plurality of range images for registration of the range image with a second range image of the plurality of range images from a different pose than the range image;
to identify the feature present in the second range image of the plurality of range images;
to deconstruct the feature present in the second range image into second virtual gimbal information for the second range image using estimates of two or more orthogonal axes for the feature present in the second range image, wherein the second virtual gimbal information defines a coordinate system for the second range image for translation of the second range image to the common coordinate system; and
to register one of the range image or the second range image to the other one of the second range image or the range image based upon the common coordinate system.

9. The apparatus of claim 8, wherein the feature comprises a corner present in the range image.

10. The apparatus of claim 9, wherein the range image comprises a depth map for a scanned volume.

11. The apparatus of claim 8, wherein the two or more orthogonal axes comprise three orthogonal axes, and wherein the common coordinate system for the range image comprises a coordinate system having an X axis, a Y axis, and a Z axis.

12. The apparatus of claim 8, wherein the at least one processor is further configured:
to estimate a pose orientation for the range image using the virtual gimbal information for the range image;
to estimate a second pose orientation for the second range image using the second virtual gimbal information for the second range image; and
to determine relative translation information for registering the range image and the second range image to the common coordinate system.

13. The apparatus of claim 12, wherein the at least one processor is further configured:
to generate a pose matrix for the range image for estimating the pose orientation for the range image;
to generate a second pose matrix for the second range image for estimating the second pose orientation for the second range image; and
to generate a translation vector using the pose matrix for the range image and the second pose matrix for the second range image for determining the relative translation information.

14. The apparatus of claim 13, wherein the at least one processor is further configured:
to combine the range image and the second range image.

15. A non-transitory computer-readable medium having program code recorded thereon for determining a common coordinate system for registration of a plurality of range images, the program code comprising:
program code executable by a computer for causing the computer to:

identify a feature present in a range image of the plurality of range images; and deconstruct the feature present in the range image into virtual gimbal information for the range image using estimates of two or more orthogonal axes for the feature present in the range image, wherein the virtual gimbal information defines the common coordinate system for the plurality of range images for registration of the range image with a second range image of the plurality of range images from a different pose than the range image;

identify the feature present in the second range image of the plurality of range images;

deconstruct the feature present in the second range image into second virtual gimbal information for the second range image using estimates of two or more orthogonal axes for the feature present in the second range image, wherein the second virtual gimbal information defines a coordinate system for the second range image for translation of the second range image to the common coordinate system; and register one of the range image or the second range image to the other one of the second range image or the range image based upon the common coordinate system.

16. The non-transitory computer-readable medium of claim 15, wherein the feature comprises a corner present in the range image.

17. The non-transitory computer-readable medium of claim 15, wherein the two or more orthogonal axes comprise three orthogonal axes, and wherein the common coordinate system for the range image comprises a coordinate system having an X axis, a Y axis, and a Z axis.

18. The non-transitory computer-readable medium of claim 15, wherein the program code further comprises program code for causing the computer to:

estimate a pose orientation for the range image using the virtual gimbal information for the range image;

estimate a second pose orientation for the second range image using the second virtual gimbal information for the second range image; and determine relative translation information for registering the range image and the second range image to the common coordinate system.

19. The non-transitory computer-readable medium of claim 18, wherein the program code further comprises program code for causing the computer to:

to generate a pose matrix for the range image for estimating the pose orientation for the range image;

to generate a second pose matrix for the second range image for estimating the second pose orientation for the second range image; and to generate a translation vector using the pose matrix for the range image and the second pose matrix for the second range image for determining the relative translation information.

20. The non-transitory computer-readable medium of claim 19, wherein the program code further comprises program code for causing the computer to:

combine the range image and the second range image.

21. An apparatus for determining a common coordinate system for registration of a plurality of range images, the apparatus comprising:

means for identifying, by a processor-based platform configured for processing images, a feature present in a range image of the plurality of range images; and means for deconstructing, by the processor-based platform, the feature present in the range image into virtual gimbal information for the range image using estimates of two or more orthogonal axes for the feature present in the range image, wherein the virtual gimbal information defines the common coordinate system for the range image with a second range image of the plurality of range images from a different pose than the range image;

means for identifying, by the processor-based platform, the feature present in the second range image of the plurality of range images;

means for deconstructing, by the processor-based platform, the feature present in the second range image into second virtual gimbal information for the second range image using estimates of two or more orthogonal axes for the feature present in the second range image, wherein the second virtual gimbal information defines a coordinate system for the second range image for translation of the second range image to the common coordinate system; and means for registering, by the processor-based platform, one of the range image or the second range image to the other one of the second range image or the range image based upon the common coordinate system.

22. The apparatus of claim 21, wherein the feature comprises a corner present in the range image.

23. The apparatus of claim 21, wherein the two or more orthogonal axes comprise three orthogonal axes, and wherein the common coordinate system for the range image comprises a coordinate system having an X axis, a Y axis, and a Z axis.

24. The apparatus of claim 21, further comprising:

means for estimating a pose orientation for the range image using the virtual gimbal information for the range image;

means for estimating a second pose orientation for the second range image using the second virtual gimbal information for the second range image; and means for determining relative translation information for registering the range image and the second range image to the common coordinate system.

25. The apparatus of claim 24, wherein the means for estimating the pose orientation for the range image includes means for generating a pose matrix for the range image and the means for estimating the second pose orientation for the second range image includes means for generating a second pose matrix for the second range image, and wherein the means for determining the relative translation information includes means for generating a translation vector using the pose matrix for the range image and the second pose matrix for the second range image.

26. The apparatus of claim 25, further comprising:

means for combining the range image and the second range image.

* * * * *